United States Patent

Hulsmann et al.

[15] 3,696,141
[45] Oct. 3, 1972

[54] PROCESS FOR THE PRODUCTION OF METHYL BENZOATE

[72] Inventors: Hans Leo Hulsmann, Wengern; Gustav Renckhoff; Albino Pastura, both of Witten Ruhr, all of Germany

[73] Assignee: Dynamit Nobel Aktiengesellschaft, Troisdorf, Germany

[22] Filed: May 27, 1970

[21] Appl. No.: 41,054

[30] Foreign Application Priority Data

May 30, 1969 Germany..........P 19 27 554.8

[52] U.S. Cl..........260/476 R, 260/475 R, 260/475 B
[51] Int. Cl..........................C07c 69/78, C07c 69/80
[58] Field of Search............260/476 R, 475 B, 475 R

[56] References Cited

UNITED STATES PATENTS 2,894,978  7/1959  Katzshmann...........260/476 R

Primary Examiner—Lorraine A. Weinberger
Assistant Examiner—R. S. Weissberg
Attorney—Craig, Antonelli, and Hill

[57] ABSTRACT

Methyl benzoate having a purity of at least 99 percent is produced from the by-products obtained in the manufacture of dimethyl terephthalate by the oxidation of p-xylene by subjecting said by-products to an oxidative treatment, preferably with molecular oxygen, for example, air, and then fractionally distilling the oxidized product to obtain substantially pure methyl benzoate. In this way, compounds which can be separated only with difficulty from methyl benzoate by fractional distillation are oxidized, leaving only substances which are separable therefrom by distillation.

8 Claims, No Drawings

PROCESS FOR THE PRODUCTION OF METHYL BENZOATE

This invention relates to the production of methyl benzoate. More particularly, it relates to a process for obtaining substantially pure methyl benzoate, i.e., with a purity of at least 99 percent from the by-products of the manufacture of dimethyl terephthalate by atmospheric oxidation of p-xylene.

In the industrial preparation of dimethyl terephthalate by the atmospheric oxidation of p-xylene in the liquid phase, for example, by the process described in German Pat. No. 1,041,945, which corresponds to U. S. Pat. No. 2,894,978, the acids obtained during oxidation are initially esterified with methanol. The resulting mixture of methyl esters, mainly p-methyl toluate, dimethyl terephthalate and the methyl esters of mono- and polyfunctional acids, is separated during the process, for example, either by distillation, by recrystallization or by a combination of both processes, into dimethyl terephthalate, oxidation intermediates (primarily methyl toluate) and by-products. The by-products have a lower boiling point than dimethyl terephthalate and contain methyl benzoate. The methyl benzoate is mainly concentrated in the residual product of the rectification by means of which the methanol is removed. These by-products have hitherto been burned as valueless waste products, but constitute the starting material in the present invention.

The extraction of substantially pure methyl benzoate on an economical basis from the first runnings of crude dimethyl terephthalate fractionation, i.e., from the above-mentioned starting material, was not possible heretofore because a large number of accompanying compounds with boiling points close to that of the methyl benzoate caused very severe technical difficulties during the attempted fractionation. If a bubble cap column with 20 theoretical plates is used for the fractional distillation of the starting material, then a concentration of the methyl benzoate of up to about 80 percent is possible. A further fractionation of the distillate thus concentrated with respect to methyl benzoate, using a column with 40 theoretical plates and a reflux ration of 40 : 1, does indeed yield fractions in which the methyl benzoate is present in a purity of at least 90 percent. However, these fractions only represent 71 percent by weight of the starting material. On reducing the reflux ration to 20 : 1, the yield of substantially pure methyl benzoate (purity of at least 99 percent) is reduced to 61 percent by weight, and at a reflux ratio of 10 : 1, the yield is lessened to 23 percent by weight of the starting material. Thus, despite the large amount of equipment used and the long duration of fractionation caused by high reflux rations, a substantially pure methyl benzoate with a content of at least 99 percent can only be obtained in moderate or poor yields.

Accordingly, one of the objects of the present invention is to provide a procedure for obtaining methyl benzoate of high purity and good yield which overcomes the disadvantages and deficiencies of the prior art methods.

Another object of the present invention is to provide a process for producing methyl benzoate in an economical and advantageous manner.

A further object of the invention is to provide methyl benzoate having a purity of at least 99 percent.

These and other objects and advantages of the present invention will become apparent to those skilled in the art from a consideration of the following specification and claims.

In accordance with the present invention, a process is provided for obtaining substantially pure methyl benzoate from a starting material as hereinbefore defined which comprises subjecting the starting material to an oxidative treatment whereby compounds which can only be separated by fractional distillation from methyl benzoate with difficulty are oxidized, and fractionally distilling the oxidized product to obtain substantially pure methyl benzoate.

The oxidation can be performed by generally known methods, for example, with potassium permanganate, or preferably by oxidation with gaseous oxygen (molecular oxygen), for example, atmospheric oxidation, of the starting material in the presence of cobalt or ceric salts as oxidation catalysts and in the presence of peroxide-forming compounds. The cobalt or ceric salt is used, for example, in a quantity of about 0.05 to 0.5 percent by weight, based on the amount of starting material. Particularly suitable peroxide-forming compounds are aldehydes or $\alpha$-methylene-ketones, for example, methyl ethyl ketone. The peroxide-forming compounds are also preferably used in quantities of about 0.05 –0.5 percent weight.

Following the procedure of the present invention, the number of compounds with boiling ranges close to that of methyl benzoate is limited to a few compounds which are easily separable by distillation, so that subsequent fractional distillation under very simple conditions provides methyl benzoate with the desired high purity. This is surprising inasmuch as the by-products, in the course of the preparation of dimethyl terephthalate, have already been subjected several times to essentially the same oxidation.

The oxidative treatment of the starting material before distillation can be performed in various ways. In a batch process, the starting material can be heated in the body of the distilling apparatus in an air flow and in the presence of oxidation catalysts. In a continuous process, oxidation can be performed in a suitable hold-up vessel connected in series with the fractionating column.

The oxidative treatment of the crude ester generally leads to a moderate rise in the acid number. In order to obtain a completely neutral ester during fractionation, it is advisable to neutralize the mixture prior to distillation with an equivalent amount of an alkaline compound. It is preferable to use potassium hydroxide for this purpose because it dissolves completely in the material to be distilled.

The methyl benzoate provided in very high purity according to the process of this invention is a valuable compound for organic syntheses. It is particularly suited for the preparation of pure alkali metal salts of benzoic acid, for example, for use as preservatives.

The following Example is given merely as illustrative of the present invention and is not to be considered as limiting. Unless otherwise noted, the percentages therein and throughout the application are by weight.

EXAMPLE

An industrial methyl benzoate obtained from the residual product of the rectification of dimethyl terephthalate, produced as a by-product during the manufacture of dimethyl terephthalate in accordance with the process of German Pat. No. 1,041,945, is employed as the starting material. It has the following composition:

0.02% methanol
0.06% toluene
1.38% p-xylene
1.23% components with boiling ranges of 140°–198° C.
92.9% methyl benzoate
0.33% o-methyl toluate
4,8% p-methyl toluate The above composition was determined by gas chromatography.

After the addition of 1.4 parts by weight of fatty acid cobalt salt and 4 parts by weight of methyl ethyl ketone, 700 parts by weight of the starting material is refluxed for 3 hours in a deflector plate column having 20 plates, while an air flow of 1 part by volume per minute is passed through the boiling product. The mixture is subsequently fractionally distilled. The reflux ratio is 5 : 1. The results obtained are shown in the Table below under "Run 1."

For comparison purposes, Runs 2, 3 and 4 in the Table illustrate fractional distillation processes, performed analogously with the same starting material, but without the prior oxidative treatment according to the invention. A column with 40 plates is used. In these comparative tests, the reflux ratio is varied from 10 : 1 to 40 : 1. In all of the tests, the residue is about 10 percent by weight of the starting material.

TABLE

| Run | Number of plates in column | Reflux Ratio | Methyl benzoate with a content of at least 99% by weight as % of total distillate |
|---|---|---|---|
| 1 | 20 | 5 : 1 | 84 |
| 2 | 40 | 10 : 1 | 25 |
| 3 | 40 | 20 : 1 | 67 |
| 4 | 40 | 40 : 1 | 78 |

A poorer result is obtained in comparative test-Run 4 with the much more effective column and the very high reflux ratio, as compared with Run 1 according to the present invention, wherein a less expensive column and a lower reflux ration is used.

In summary, the present invention provides a process for obtaining methyl benzoate having a purity of at least 99 percent from the by-products of the production of dimethyl terephthalate by the air oxidation of p-xylene by way of the methyl ester of p-toluic acid in the liquid phase, such by-products occurring, for example, during the manufacture of dimethyl terephthalate according to the process of German Pat. No. 1,041,945 (U.S. Pat. No. 2,894,978). Basically, the invention is characterized by the step of subjecting these by-products to an oxidative treatment prior to fractional distillation.

The starting material employed in the process of the present invention is obtained, for example, by oxidizing a liquid phase mixture of p-xylene and p-methyl toluate with an oxygen-containing gas at a temperature of about 80° to about 250° C. in the presence of an oxidation catalyst, for example, the cobaltous salt of the fatty acids obtained as first runnings in the distillation of coconut oil fatty acids, until substantial oxidation is obtained, esterifying the resultant mixture by heating with methanol in the presence of an esterification catalyst, cooling the esterification mixture, removing the recrystallized dimethyl ester of terephthalic acid by filtration and evaporating excess methanol from the filtrate, leaving an evaporation residue mainly comprising the methyl ester of p-toluic acid. The latter residue is employed as the starting material in the present invention. Other details for obtaining this residue are disclosed in said U.S. Pat. No. 2,894,978.

The oxidative treatment of the starting material in connection with the present invention is preferably carried out at temperatures ranging from approximately 100° C. to the boiling point of the starting material employed.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A process for producing methyl benzoate having a purity of at least 99 percent from a starting material comprising the by-products obtained in the manufacture of dimethyl terephthalate by the oxidation of p-xylene, said by-products being obtained by oxidizing a mixture of p-xylene and p-methyl toluate in the liquid phase with an oxygen-containing gas at a temperature of about 80° to about 250° C. in the presence of an oxidation catalyst until substantial oxidation is obtained, esterifying the resultant mixture by heating with methanol in the presence of an esterification catalyst, and removing dimethyl terephthalate and methanol therefrom, which comprises subjecting said starting material to an oxidative treatment with a molecular oxygen-containing gas in the presence of about 0.05 – 0.5 percent by weight of a cobalt of ceric salt and about 0.05 – 0.5 percent weight of a peroxide-forming compound, whereby compounds which can be separated only with difficulty from methyl benzoate by fractional distillation are oxidized, and fractionally distilling the oxidized product to obtain a substantially pure methyl benzoate.

2. The process of claim 1, wherein said ketone is methyl ethyl ketone.

3. The process of claim 1, wherein about 0.05 to 0.5 percent by weight, based on the amount of starting material, of said peroxide-forming compound is employed.

4. The process of claim 1, wherein said oxidative treatment is conducted by oxidation with air.

5. The process of claim 1, wherein the product of said oxidative treatment is neutralized before being fractionally distilled.

6. The process of claim 5, wherein potassium hydroxide is employed as the neutralization agent.

7. The process of claim 1, wherein said peroxide-forming compound is an aldehyde or an α-methylene ketone.

8. The process of claim 5, wherein an alkaline hydroxide is employed as the neutralization agent.

* * * * *